3,756,959
ECOLOGICALLY ACCEPTABLE METHOD OF BREAKING MINERAL OIL EMULSIONS-SUSPENSIONS
Emil Alfred Vitalis and Ralph Joseph Chamberlain, Stamford, Conn., assignors to American Cyanamid Company, Stamford, Conn.
Filed Oct. 20, 1971, Ser. No. 190,994
Int. Cl. B01d 17/04
U.S. Cl. 252—336                              8 Claims

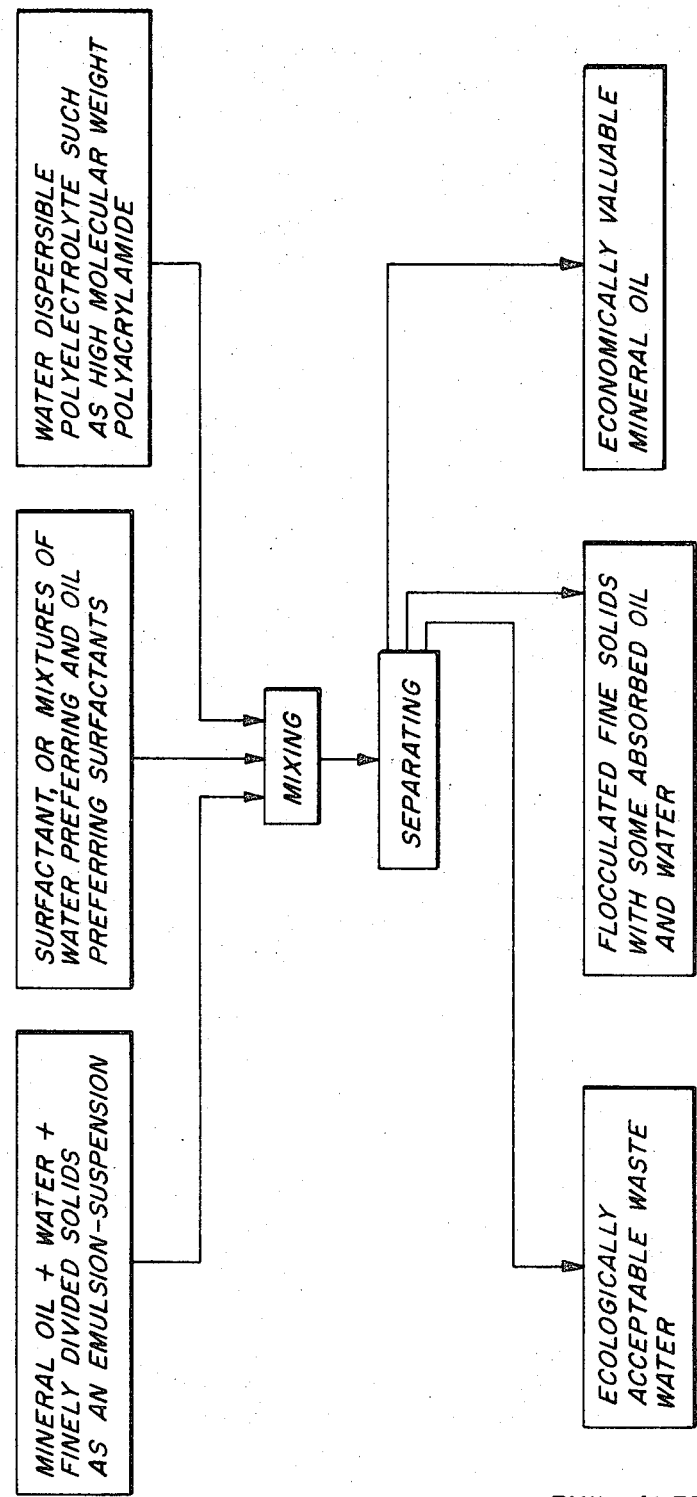

ABSTRACT OF THE DISCLOSURE

A wide variety of mineral oil (petroleum) suspensions of the oil-in-water, water-in-oil types, particularly those containing finely divided solid suspended matter are broken into an economically valuable mineral oil fraction low in suspended solids and water and an ecologically acceptable waste water by using a high molecular weight water soluble polyelectrolyte, such as a polyacrylamide, and at least one surface acting agent such as an alkyl sulfosuccinate. Other polyelectrolytes and other surfactants and mixtures thereof are effective with a wide variety of such emulsion-suspensions; and result in an ecologically effective separating procedure. The combination of (1) a preferentially water soluble surfactant such as sodium isopropylnaphthalene sulfonate which is particularly effective in coalescing water particles, (2) a preferentially oil soluble surfactant such as sodium di(2-ethylhexyl)sulfosuccinate which is particularly effective in coalescing oil particles, and (3) a high molecular weight polyacrylamide of up to about 20 million molecular weight which is particularly effective in flocculating finely divided solids, potentiate and synergistically aid each other and with heat to thin the oil layer, if it is viscous, gives particularly ecologically advantageous results.

SUMMARY OF THE INVENTION

This invention relates to a process for separating mineral oil emulsions containing finely divided solid materials into an economically treatable mineral oil fraction which is low in both suspended solids and water and an ecologically acceptable waste water, with concentration of the finely divided solids into a minimal volume of flocculated finely divided solids which contains some residual oil and water.

This process is particularly useful with residual suspension-emulsions which are separated as waste stream from refinery operations, transport operations, and other treatment plants.

The breaking of mineral oil and water emulsions, often called petroleum and water emulsions, of both the oil-in-water and the water-in-oil types are the subject of prolific art. Much of the mineral oil (petroleum) which is produced in various countries of the world has at least some water and at least some finely divided solid components present therein. If the petroleum itself as extracted from the earth as a crude does not have such solids and water present; then scales, salts and dirts from oil well field equipment, pipe lines, tankers and other sources introduces water and solids into the mineral oil. In conventional processes of breaking petroleum emulsions to release the mineral oil for use in refineries and the water therefrom for reuse or disposal, there is a tendency for the more difficultly breakable portions to be concentrated. The easily removable water, that is water that can be removed by conventional emulsion breaking techniques, is separated for discard or reuse, and the mineral oil is fed to refineries wherein by means of stills, crackers and other treatment the mineral oil is converted into gasoline and other fractions which have economic potential. During such refining, the finely divided solid materials, oil-in-water emulsions, water-in-oil emulsions, and combinations of oil-in-water, water-in-oil and finely divided solids tend to become concentrated in discard streams.

In the past, the discard streams from refineries which contain the more difficultly treatable suspension-emulsion fractions have been collected and trucked to disposal lagoons or other locations where the material could be discarded. First this is an economic waste, and second it is an ecological disaster. A major refinery may have tens of thousands of pounds a day of such emulsion-suspensions which are not acceptable for dumping in a river or an ocean, and which are not acceptable to be left in waste lagoons where the mixture would represent a long term hazard.

PRIOR ART

The prior art on petroleum treating is voluminous. The crudes from various oil fields differ in composition, and requirements for treatment. This is compounded by the wide variety of exposure, storage and shipping conditions to which mineral oils are subjected.

The literature, both patent and other publications, is broad and in part inconsistent on surfactants, flocculants, and their usages for other purposes as well as to treat mineral oil emulsions as produced from wells, and various other petroleum streams from almost any source. Lubricating and cutting oils require treatment from many manufacturing operations.

As the volume of mineral oil products to be treated increases, and pollution standards are raised, the systems for recovery are increasingly varied and complex. Many different inconsistent recommendations on the use of polymers and demulsifiers appear throughout the literature.

While by no means comprehensive or complete, a few prior patents and publications of interest include:

1,976,679, Fikentscher et al., Production of Dispersions, Oct. 9, 1934, discloses the use of materials such as sodium salt of polymerized acrylic acid with or without wetting agents or soaps for the dispersion of inorganic or organic pigments as a viscous dispersion for treating fabrics.

2,327,302, Dittmar, Soap Composition, Aug. 17, 1943, discloses the use of a precipitate-inhibiting amount of an alkali metal salt of a halogen-substituted polyacrylic acid as a hard water softening agent or for redissolving precipitates already formed and mentions use in dyeing, water softening or boiler feed water.

2,533,166, Jones, Process for Polymerizing Water-Soluble Polyacrylamides and Poly - Alpha - Substituted Acrylamides, Dec. 5, 1950, discloses a method of producing polyacrylamides having a high peptizing action to "prevent the sedimentation of finely divided materials such as pigments and silver halide dispersed in aqueous media." (Column 1, lines 27–29.)

2,980,609, House and Moore (Cyanamid), Clarification of Industrial Waters, Apr. 18, 1961, shows a coagulation of industrial waters with a hydrophilic aminoaliphatic linear polymer having free amine groups directly on the polymer chain and mentions molecular weight of at least 2,000.

2,980,609, House and Moore (Cyanamid), Clarification Treatment of Heterogeneous Aggregates Such as Clay, Apr. 25, 1961, relates to the fractionation of heterogeneous material such as clay by the use of the sodium salt of polyacrylonitrile among many other materials. This patent discloses the separation of dilatant from thixotropic clays useing these polymers and stresses the non-Newtonian characteristics of the clays.

3,025,236, Barrett and Sauber, Flocculation of Solids, Mar. 13, 1962, shows the sodium salt of sulfonated dodecyl diphenyl oxide and an acrylamide polymer as a flocculating agent.

3,090,759, Jenkins, Process for Breaking Emulsions of the Water-in-Oil Class, May 21, 1963 discloses the use of a homopolymerized acrylamide and certain related copolymers having a molecular weight of at least 40,000 and preferably up to one million for use in breaking oil-in-water emulsions. Also disclosed is the use of these polyacrylamides admixed with compatible oil and water demulsifiers (column 6, lines 55 to 60). The proportions from 1 p.p.m. to about 500 p.p.m. of the volume of the emulsion treated are recommended.

3,418,237, Booth and Dobson (Cyanamid), Settling of Non-Argillaceous Ore Pulps and Mineral Suspensions by Use of Water-Soluble Acrylic Polymers, Dec. 24, 1968, (filed Dec. 22, 1953), shows copolymers of acrylamide and acrylic acid with a molecular weight of at least 10,000 for improving settling filtration and chartcteristics of ore pulps and mineral suspensions. The references cited, including those added by a Certificate of Correction, not herein specifically listed, are hereby incorporated by reference.

3,480,761, Kolodny and Booth (Cyanamid), Clear Overflow Settling With Very High Molecular Weight Polyelectrolytes, Nov. 25, 1969, shows a very high molecular weight polyacrylamide with a very low degree of hydrolysis in the flocculation and polymerization of solids from an aqueous system.

The text "Emulsions;" Theory and Practice, Becher Paul, from the American Chemical Society monograph series, Reinhold Publishing Corporation, New York, 1965, has chapter 9 devoted to demulsification. This text has 97 references cited in this particular chapter, and mentions the churning of butter as a specific early embodiment of breaking oil-in-water emulsions.

The present process is particularly useful in conjunction with such waste mixtures as have been previously considered completely untreatable but is also useful in more economically treating suspension-emulsions which have been more or less tractable to treatment by previous methods.

The waste streams may contain from very thin mineral oil fractions, almost in the gasoline range, down to heavy residual oils which must be heated to be flowable. The solids suspended in the material are usually finely divided materials, which can include salts which are soluble in water but are in larger quantity than is soluble in the water present, such as sodium chloride, and also includes insoluble salts such as calcium carbonate, ferric phosphate, hydroxides, such as ferric hydroxide, aluminum hydroxide, silicates, phosphates, calcium magnesium phosphates, clays, soot, carbon and plain "dirt" which is practically anything organic or inorganic in finely divided form. The finely divided particles may range from smaller colloidal sizes of the order of 0.1 microns up to and including particles which are large enough to settle when standing by gravity.

Particles which freely settle on standing by gravity may be settled out and discarded.

The nature of the emulsion-suspension is heterogeneous at best. The emulsion may be of a water-in-oil or oil-in-water, or a mixture of both, and the insoluble solid particles can be suspended in either the oil phase, the water phase or the interface between the phases. Finely divided solid particles in themselves may act as emulsifying agents under some conditions. The emulsion-suspension mixture may have various types of emulsifying or suspending agents present.

In the present invention, it would seem as though the surfactants aid in breaking the water-in-oil and oil-in-water emulsions causing the separate coalescence of each of the oil and water particles. The polyelectrolyte aids in the flocculation and separation of the finely divided solids from both the oil and water phases as well as the interfaces.

In the past the materials now being treated have been discarded without treatment because no successful treatment was known.

Because the emulsion suspension being fed into the system is often primarily a mixture of waste streams from various sources, the composition may vary widely. Usually it contains at least about 20% mineral oil.

As here used the term mineral oil refers to a mineral oil of any type, including crude oil directly as recovered from a well, or any of the streams in a petroleum refinery which may contain from almost gasoline type components down through residual still bottoms. Light ends may be flashed off in the vapor phase or may be left with the other fractions, so that even though the oil fraction is not primarily a gasoline type, gasoline components may be present.

The emulsion suspension from such a source usually contains at least about 10% water. Less than this may be present in a material to be treated, but usually if the water is of smaller proportion, successful treatment by previously known methods has been accomplished. The composition may contain up to about 80% of water. The water may be from almost a salt-free water to one which is essentially salt saturated. Under many conditions, the water results from the influx of sea water or is a residual water layer in which some sea water salts and other salts have been dissolved so that the aqueous phase may be nearly saturated in sea water salts as well as many other components. Water may have been evaporated off, which increases the salts concentrations. The oil may be from a water flooding petroleum recovery operation of an oil field.

The finely divided solids are usually a strictly garbage type fraction which contains finely divided silicates, from sands, clays, dirt, soot, phosphates, precipitate salts such as calcium carbonate, and oxides and hydroxides such as ferric or ferrous hydroxide or aluminum hydroxide as well as corrosion products from the corrosive effects of acid or sour crudes in tanks, pipelines, tankers and other containers.

Frequently incoming mineral oil is run through processes to separate out fractions which may be fed to stills or catalytic crackers or other refinery processes, with the salts and insolubles and residual water being concentrated so that the intractable fractions from all over a refinery are fed to the present system for treatment. Because of the varigated source of solids, the solid materials may be only a fraction of 1% up to about 40% by weight.

From this heterogeneous mixture, by the treatment of this invention, the oil coalesces to form a low water, low salt layer which may be added to a refinery stream whose composition it most nearly resembles for distillation, cracking, hydrogenation, desulfurization, or other processing to obtain economically useful products including gasoline, lubricating oil, heating oil, residual fuel oil and the like.

The water layer is ecologically acceptable as a discardable waste.

In some areas water being discarded must contain less than 5 parts per million of mineral oil. Here the discarded aqueous layer under preferred operating conditions contain less than 2 parts per million of mineral oil. Waste water may contain a considerable proportion of dissolved salts depending upon the feed to the system. The flocculated solids component contains essentially all of the undissolvable solids as well as the slightly soluble salt components which are not soluble in the volume of water present. These solids often contains minor quantities of water as well as mineral oil components. Depending upon the thicknesss of the mineral oils which are fed to the system, because of the viscosity of the mass, considerable oil may remain with the solids. From a few percent to substantial quantities of ecologically acceptable waste water are obtained which can be dumped into the discard streams of the refinery with economically useful quantities of oil being recovered and more importantly the quantity of flocculated suspended solids is a minimum.

The flocculated mineral solids as so concentrated may be disposed of by dumping in a suitable lagoon or dump area or may be pumped down an exhausted oil or water well to be returned into an underground mineral formation or may be sufficiently concentrated to be fed to a furnace unit in which the carbonaceous components are burned to carbon dioxide, with the nitrogeneous components being released as nitrogen and sulfur components as sulfur dioxide or sulfur trioxide. Depending upon temperature, the solid components can be discarded as a slag or finely divided petroleum free materials which can be used as a sand filler for concrete, land fill, cinder blocks or filter medium.

The conjoint use of a preferentially oil soluble surfactant, and a preferentially water soluble surfactant, and high molecular weight polyelectrolyte is not only advantageous in breaking refinery waste emulsions but is also useful in cleaning up oil spills, cleaning up ships tanks or holds, containing oil and rust emulsified with water, fresh or salt to form a sludge, with either an oil rich emulsion, as after shipping oil, or a water rich emulsion as after ballasting with sea water; also in assisting to separate mineral oil from mineral formations, such as in the Athabaska oil sands, or oil shales. With heavy or thick mineral oil fractions, a viscosity reducing fraction such as gasoline may be added, and the mixtures may be heated to reduce viscosity. Obviously heat exchange systems are used to have heat in the operations.

A wide variety of emulsion-suspensions may be advantageously treated by the process of this invention. In one system of refinery operation, by product or waste suspension-emulsion streams from all over the refinery are fed into a tank, typically a 32,000 barrel tank, in which they are allowed to separate by gravity, optionally with added heat. The upper part is a high oil layer which may contain from about 60 to 98% oil and from 0.01% up to about 10% by weight suspended solids. A copolymer usage of about 0.5 to about 50 parts per million with a surfactant usage of about 5 to about 6,000 parts per million, with about equal parts of a preferentially water soluble component and a preferentially oil soluble component aids in separation of water and solids from this layer.

Prior art usages have given reasonably good separation of this layer. The high oil layer which separates at the top of the tank is fed with incoming crude to appropriate refinery streams.

In the big tank, the water tends to separate to the bottom. Separation may be aided by from about 0.5 to 50 parts per million of polymer and from about 5 to 1,000 parts of the mixed surfactant. Finely divided solids may be present from 0.01% up to about 20% by weight. Prior art methods have given reasonably good separation of this layer. The use of the present polyelectrolyte mixed surfactants improves the separation so that a more ecologically acceptable water layer is separate than without the polyelectrolyte-surfactant additions.

A sludge of oil, water and suspended solids tends to concentrate towards the middle of the tank. There is not a sharp separation. The sludge which contains about 20% to about 60% oil from a few percent up to about 40% finely divided solids has been a center layer and in the past has been considered an untreatable fraction to be discarded. A polymer concentration of about 25 to 500 parts per million and a surfactant concentration of about 100 to 2,000 parts per million of mixed surfactant causes this sludge to split with the recovery of additional economically valuable oil and the separation of an ecologically acceptable waste water. The solids concentrate to a much thicker consistency which can be called a sludge cake which may be separated for disposal or burning. The greatly reduced quantity of discarded sludge cake is highly advantageous.

Some treatment may be accomplished in the big tank but conveniently a swinging draw-off pipe is set at a level to draw-off the mixture at the level of the thickest sludge separating the oil rich and water rich portions of the tank. This layer is drawn out and fed to a separate treating tank. For experimental or smaller scale work, a 440 barrel tank, frequently a rectangular tank about 14 feet deep and containing 440 barrels when full, sometimes designated a Baker tank is used. With larger refinery flows, a 6,000 barrel tank can be used for the separation. The two surfactants and the polymer may be added separately or in mixed combinations with the sludge fed to the separating tank. These components may be mixed and fed as a solution in water, isopropanol and water or other solvents, to the system. Conveniently, the mixing is accomplished by feeding the surfactant and the polymer into a flowing stream as the oil-water-solid suspension-emulsion is fed to the separating tank. Mixing is accomplished by turbulence in the flowing stream, without addition time or power requirements.

The surfactant and polymer may be fed to the tank if provisions for stirring to disperse are incorporated in the tank.

The mixture in the tank separates slowly so that a period of several days standing is preferred for segregation of the economically valuable mineral oil and the ecologically acceptable waste water. If a 32,000 barrel tank is used, and the center sludge feed for a 6,000 barrel tank are taken 2 or 3 times a week, an effectively continuous flow with a capacity large enough for the normal refinery is obtained.

Obviously the sizes of the storage tank and the rate of treatment are adapted to the separating requirements of a refinery. The separating requirements may vary with feed stocks, and the degree of contamination in transit of feed stocks to the refinery, as well as the throughput of the refinery.

The surfactants readily dissolve and disperse in the emulsion-suspension. The polyelectrolyte dissolves more slowly and forms viscous solutions at concentrations of a few tenths of one percent. Preferably the polyelectrolyte is dissolved at a concentration of less than about ½ percent, by stirring until dissolved, frequently at least an hour. The components may be mixed dry, and all dissolved concurrently, and added to the emulsion-suspension.

If dissolved or suspended in an isopropanol-water mixture, the mixture is more readily dispersed in water to be fed to the emulsion-suspension system.

Whereas parts above are given by weight, frequently in oil refinery practice, a "S&W" test is used for sediment and water in which an emulsion-suspension is mixed with 50% by volume of xylene and the mixture subject to hot centrifuging, at about 150° F., until the mixture splits into a solids layer, a xylene and oil layer, and a water layer. The volume may be determined by inspection. Such hot xylene centrifuging to determine the sediment or suspended solids and water is faster and more convenient than gravimetric determination. The figures are different in that the solids have a higher specific gravity and hence have a smaller volume percentage than weight percentage, but on the other hand they are not as well packed for which appropriate allowance must be made. For any one refinery and general type of crudes and operating conditions, either method of reporting is completely consistent and gives excellent control of operations.

For purposes of convenience, unless otherwise clearly set forth, percentages are given in this specification by weight, but can be converted to volume ratios or percentages where other methods of reporting are preferred.

Among the preferentially oil soluble surface active agents are such sulfosuccinates as sodium di(tridecyl)-sulfosuccinate, sodium di(hexyl)sulfosuccinate, di(sodium polyoxyethanol)-sulfosuccinate and the various grades of sodium di(2-ethylhexyl)sulfosuccinate. This last material is sold by American Cyanamid Company under the trademark Aerosol® OT and is one of the first of the synthetic surface active agents. A pharmaceutical grade of sodium di(2-ethylhexyl)sulfosuccinate is available, and is used as a fecal softener; toxicity is minimal. Other useful oil soluble surface active agents include sodium or calcium petroleum sulfonates, sulfonated or sulfated castor oil, sulfonated or sulfated tallow, sulfated or sulfonated oleic acid, and sulfonated or sulfated soybean oil.

Among the preferentially water soluble surface active agents are sodium isopropylnaphthalene sulfonate, other alkyl aryl sulfonates, mixed octyldecylamine octyldecylguandine polyoxyethanol, and others obtained under a wide variety of trade designations in the industry. These include sodium dodecylbenzene sulfonate, stearamidopropyldimethyl-β-hydroxyethyl ammonium nitrate, tall oil ethoxyethylate with from about 6 to 15 moles of ethylene oxide, sodium lauryl sulfate, sodium octadecyl sulfate, sodium alkyl sulfates from alpha olefins, or from oxoprocess alcohols. Nonyl phenol if ethoxylated with about 9.5 moles of ethylene oxide is both water and oil soluble, and by changing the degree of ethoxylation can be modified to either the oil or water side.

One grade of polyacrylamide of about 15 million molecular weight and less than one percent hydrolysis is conveniently obtainable on the commercial market. Potable water grade are available. This product, with a low residual monomer content is acceptable for the treatment of drinking water. Other polymers of acrylamide-acrylic acid, monomethyl amine epichlorohydrin, quaternized monomethylamine epichlorohydrin, ethylene diamine dimethylamine epichlorohydrin, dimethylamino ethyl methacrylate acrylamide copolymer, and formaldehyde dimethylamine reacted with polyacrylamide.

Other water soluble high molecular weight polymers are described in the patents above cited, particularly 3,418,237 and 3,480,761.

The accompanying figure shows in diagrammatic form the admixtures of the emulsion-suspension containing the mineral oil, finely divided solids and water with the surfactants, or mixtures of water preferring and oil preferring surfactants and the high molecular weight polyelectrolyte such as polyacrylamide in a first mixing operation which may occur in a separate tank, in the principal tank for treatment, or by addition in any order to the flowing material in the pipe line as it is being fed to a separating tank.

There is then shown a separating step which conventionally and conveniently occurs in a tank of such size that gravity results in the separation of an oil layer, a water layer and a central layer. The separation may be accomplished in a centrifuge or cyclone in which high accelerating forces are induced by a rapid change in direction of the liquid components so that the water is thrown to the outside and the oil is thrown towards the region of lower acceleration.

Whereas the components of the surface active agents and the polyelectrolyte may be added separately, it is convenient to use a mixture. For instance a dry mixture of 35 parts by weight of sodium di(2-ethylhexyl) sulfosuccinate using a commercial grade about 70% active and about 35 parts of sodium isopropylnaphthalene sulfonate together with 30 parts by weight of a dried polyacrylamide of about 15 million molecular weight and about one percent hydrolysis can be added to the emulsion-suspension under conditions which cause mixing.

A separate liquid comopsition to be added contained 3% by weight of the 70% active sodium di(2-ethylhexyl) sulfosuccinate, 3% parts by weight of sodium isopropylnaphthalene sulfonate, 2.5% by weight of 15 million molecular weight polyacrylamide, 9.7% by weight of isopropanol and 81.8% by weight of water. This mixture was stirred together to form a liquid mixture which could be conveniently handled as a liquid and therefore fed by liquid proportion pumps to the flowing oil-water emulsion-suspension as the emulsion-suspension was being pumped to a settling tank.

Having described the present improvements, certain exemplary details thereof are set forth in the following examples in which all parts are by weight unless otherwise clearly specified.

Example 1

A demulsifier-flocculant additive was prepared by mixing 15 pounds of a high molecular weight polyacrylamide having a molecular weight of about 15 million and about one percent hydrolysis to acrylic acid linkages with 20 pounds fo a 70% real commercial grade of sodium di(2-ethylhexyl) sulfosuccinate and 20 pounds of a commercial grade of sodium isopropylnaphthalene sulfonate. The polymer was dissolved with stirring over a period of several hours in sufficient water to make 280 gallons of solution (about 2340 pounds) and to the mixture was then added 2 pounds of a polymer of monomethylamine epichlorohydrin. Over a period of about 45 minutes, an oil-water-finely-divided-solid emulsion-suspension was filled into a Baker tank to its capacity of about 440 barrels. The demulsifier flocculant preparation was added by injection to the flowing stream that so mixing occurred as the tank was filled. A small amount of water was used to wash out the tank in which the demulsifier-flocculant mixture was prepared and added to the main tank. The tank was warmed to about 150° F., and permitted to stand. At the end of about 48 hours standing the tank showed 44 barrels of good oil on the surface and 179 barrels of clean water on the bottom. Analysis of the feed and components of recovery showed:

|  | Feed composition (by analysis) | | Component Recovery | | Percent recovery |
| --- | --- | --- | --- | --- | --- |
|  | Percent | Bbls. | Percent | Bbls. |  |
| Oil | 20 | 88 | 10 | 44 | 50 |
| Water | 40 | 176 | 41 | 179 | 100 |
| Sludge | 40 | 176 | 49 | 217 | 123 | about 50% of the oil and virtually all of the water was freed from the starting emulsion. Results are based on the S&W hot xylene centrifuge test.

By this test over 50% of the previously untreatable sludge layer was split out as an economically valuable oil or an ecologically acceptable waste water and the remaining material was the flocculated fines containing some oil which was much thickened, and thus more acceptable as a discard product for a waste lagoon. Because essentially all of the water had been removed, and the remaining sludge cake was finely divided solids particles, much of which was organic and some oil, the product was also amenable to treating by burning to give a cinder. By using a suitable incinerator for burning, an effectively smoke and hydrocarbon free stack gas is released.

Example 2

In oval pint sized glass test bottles portions of the oily sludge from refinery discard streams were added as samples. Allowed to stand, approximately 2 to 3% of the water settled out although Carl Fisher analysis showed the presence of 40 to 41% water. 100 parts per million of a 15 million molecular weight low hydrolysis polyacrylamide was added to the oily sludge as a one half percent solution. The mass gelled into a lump, then on shaking broke into large uniform clots suspended in clear water.

No separation of oil or water took place because of the massive nature of the floc. To the mixture was then added 1,000 parts per million of a mixture containing 14 parts of 70% sodium diethylhexyl sulfosuccinate, 14 days of sodium isopropylnaphthalene sulfonate, 15 parts of isopropanol and 57 parts of water. The emulsion was shaken by tipping the bottle end over end 10 times and then allowed to stand for an hour at room temperature. A 2½ inch layer of water formed at the bottom of the bottle, and crude oil separated at the top leaving a central much thickened layer containing substantially all of the finely divided solids and considerable oil.

The line of demarkation between the good oil and the thickened sludge is difficult to observe because of the dark color of the mixture. In subsequent sample bottles containing the same feed sludge, other mixtures were added to enhance separation.

In run 3, 100 parts per million of a 35% hydrolyzed 15 million molecular weight polyacrylamide, 100 parts per million of di(2-ethylhexyl) sulfosuccinate, 50:50 mixture with sodium isopropanol sulfonate were added followed by 30 parts of monomethylamine epichlorohydrin. On mixing and standing, 4 inches of slightly turbid water were obtained at the bottom and 2 inches of good oil obtained at the top.

In run 4, 100 parts of a 70% hydrolyzed 15 million molecular weight polyacrylamide, 25 parts per million of sodium di(2-ethylhexyl) sulfosuccinate, and 25 parts per million of sodium isopropylnaphthalene sulfonate were added followed by 30 parts of monomethylamine epichlorohydrin. On standing 4½ inches of slightly turbid water were obtained at the bottom and 1½ inches of good oil at the top.

In run 5, the additives were 125 parts per million of 70% sodium di(2-ethylhexyl) sulfosuccinate, 125 parts per million of sodium isopropylnaphthalene sulfonate and 100 parts per million of high molecular weight polyacrylamide. On mixing was obtained 2½ inches of clear water, some recoverable oil at the top and a much thickened and compacted sludge layer.

In run 6, the same surfactants were used together with 25 parts per million of monomethylamine epichlorohydrin and 75 parts per million of the high molecular weight polyacrylamide. Again about 2½ inches of water was obtained with some good oil at the top.

The emulsion-suspension can be treated with alkali or acid before during or after the separation process to adjust the pH to approximately neutral, or as required by waste water disposal regulations.

We claim:

1. A method of separating
   (1) an economically valuable mineral oil fraction low in suspended solids and water, and
   (2) an ecologically acceptable waste water from a suspension of finely divided solid particles in an emulsion containing mineral oil and water comprising:
   adding to and dispersing in a suspension of finely divided solid particles in an emulsion containing a mineral oil and water (a) about 0.5 to 500 parts per million by weight of said suspension emulsion of a high molecular weight water soluble polyelectrolyte and (b) at least one surface active agent containing at least one preferentially water soluble component in a water particle coalescing concentration of about 0.01 to 50 parts per part of said polyelectrolyte and at least one preferentially oil soluble component in an oil particle coalescing concentration of about 0.01 to 50 parts per part of said polyelectrolyte, and thereby flocculating the solid particles and at least in part breaking the oil and water emulsion, and by gravity or change of liquid direction separating layers of
   an economically treatable mineral oil,
   an ecologically acceptable waste water, and
   the at least partially flocculated finely divided solids.

2. The method of claim 1 in which separation is aided by a centrifugal force which subjects the suspension-emulsion to forces much greater than gravity, and heat which lowers viscosity.

3. The method of claim 1 in which the preferentially oil soluble component is a salt of a dialkyl sulfosuccinate and the preferentially water soluble component is a salt of an alkylaryl sulfonate, and the polyelectrolyte is a high molecular weight polyacrylamide.

4. A method of separating
   (1) an economically valuable mineral oil fraction low in suspended solids and water and
   (2) an ecologically acceptable waste water from a suspension of finely divided solid particles in an emulsion containing mineral oil and water comprising:
   adding to and dispersing in a suspension of finely divided solid particles in an emulsion containing a mineral oil and water (a) about 0.5 to 500 parts per million by weight of said suspension emulsion of a polyacrylamide of about 1 million to 20 million molecular weight and not over about 1% of the amide groups hydrolyzed to carboxy groups as a high molecular weight solids flocculating water soluble polyelectrolyte, and (b) a water particle coalescing concentration of a preferentially water soluble surface active agent consisting essentially of about 0.01 to 50 parts by weight of sodium isopropylnaphthalene sulfonate per part of said polyelectrolyte and (c) an oil particle coalescing concentration of a preferentially oil soluble surface active agent consisting essentially of about 0.01 to 50 parts by weight of sodium di(2-ethylhexyl) sulfosuccinate per part of said polyelectrolyte,
   thereby flocculating the solid particles and at least in part breaking the oil and water emulsion,
   and by gravity or change of liquid direction separating layers of
   an economically treatable mineral oil,
   an ecologically acceptable waste water, and
   the at least partially flocculated finely divided solids.

5. An emulsion-suspension breaking composition for separating
   (1) an economically valuable mineral oil fraction low in suspended solids and water, and
   (2) an ecologically acceptable waste water from a suspension of finely divided solid particles in an emulsion containing mineral oil and water comprising:
   (a) a polyacrylamide of molecular weight of about 1 million to 20 million, and not over 1% hydrolyzed,
   (b) a preferentially water soluble water particle coalescing surface active agent consisting essentially about 0.01 to 50 parts by weight of sodium isopropylnaphthalene sulfonate per part of said polyacrylamide and
   (c) a preferentially oil soluble oil particle coalescing surface active agent consisting essentially of about 0.01 to 50 parts by weight of sodium di(2-ethylhexyl) sulfosuccinate per part of said polyacrylamide.

6. The composition of claim 5 dissolved in an isopropanol-water carrier.

7. An emulsion-suspension breaking composition for separating
   (1) an economically valuable mineral oil fraction low in suspended solids and water, and
   (2) an ecologically acceptable waste water from a suspension of finely divided solid particles in an emulsion containing mineral oil and water comprising:
   (a) a high molecular weight water soluble polyelectrolyte
   (b) about 0.01 to 50 parts by weight of said polyelectrolyte of a preferentially water soluble water particle coalescing surface active agent and (c) about 0.01 to 50 parts by weight of said polyelectrolyte of a preferentially oil soluble oil particle coalescing surface active agent.

8. The emulsion-suspension breaking composition of claim 7 in which (a) the polyelectrolyte is a high molecular weight polyacrylamide, (b) the preferentially water soluble surface active agent comprises an alkylaryl sulfonate, and (c) the preferentially oil soluble surface active agent comprises a dialkyl sulfosuccinate.

References Cited
UNITED STATES PATENTS 2,620,386  5/1933  Johnavid _____ 4—9

JOHN D. WELSH, Primary Examiner

U.S. Cl. X.R.

252—334, 358

UNITED STATES PATENT OFFICE
CERTIFICATE OF CORRECTION

Patent No. 3,756,959　　　　　　　　Dated September 4, 1973

Inventor(s) EMIL ALFRED VITALIS and RALPH JOSEPH CHAMBERLAIN

It is certified that error appears in the above-identified patent and that said Letters Patent are hereby corrected as shown below:

Column 2, line 67, delete entire line and substitute therefor -- 2,981,630, Ben W. Rowland, CLAY PRODUCTS AND FRAC- --.

Column 3, line 5, delete "useing" and insert therefor -- using --.

Column 3, line 26, delete "chartcter" and insert therefor -- character -- .

Column 9, line 4, delete "days" and insert therefor -- parts --.

Column 9, line 26, delete "70%" and insert therefor -- 7% --.

Signed and sealed this 26th day of March 1974.

(SEAL)
Attest:

EDWARD M. FLETCHER, JR.　　　　　　C. MARSHALL DANN
Attesting Officer　　　　　　　　　Commissioner of Patents

UNITED STATES PATENT OFFICE
CERTIFICATE OF CORRECTION

Patent No. 3,756,959      Dated September 4, 1973

Inventor(s) EMIL ALFRED VITALIS and RALPH JOSEPH CHAMBERLAIN

It is certified that error appears in the above-identified patent and that said Letters Patent are hereby corrected as shown below:

Column 2, line 67, delete entire line and substitute therefor -- 2,981,630, Ben W. Rowland, CLAY PRODUCTS AND FRAC- -- .

Column 3, line 5, delete "useing" and insert therefor -- using -- .

Column 3, line 26, delete "chartcter" and insert therefor -- character -- .

Column 4, line 43, delete "precipitate" and insert therefor -- precipitated -- .

Column 9, line 4, delete "days" and insert therefor -- parts -- .

Column 9, line 26, delete "70%" and insert therefor -- 7% -- .

This certificate supersedes the Ceritficate of Correction issued March 26, 1974.

Signed and sealed this 21st day of May 1974.

(SEAL)
Attest:

EDWARD M. FLETCHER, JR.
Attesting Officer

C. MARSHALL DANN
Commissioner of Patents